United States Patent
Edwards et al.

(10) Patent No.: US 10,477,510 B1
(45) Date of Patent: Nov. 12, 2019

(54) AGGREGATING LOCATION DATA OF A TRANSACTION DEVICE AND A USER DEVICE ASSOCIATED WITH A USER TO DETERMINE A LOCATION OF THE USER

(71) Applicant: Capital One Services, LLC, McLean, VA (US)

(72) Inventors: Joshua Edwards, Philadelphia, PA (US); Abdelkadar M'Hamed Benkreira, Washington, DC (US); Adam Vukich, Alexandria, VA (US)

(73) Assignee: Capital One Services, LLC, McLean, VA (US)

(*) Notice: Subject to any disclaimer, the term of this patent is extended or adjusted under 35 U.S.C. 154(b) by 0 days.

(21) Appl. No.: 16/425,091

(22) Filed: May 29, 2019

(51) Int. Cl.
| | |
|---|---|
| *H04W 24/00* | (2009.01) |
| *H04W 64/00* | (2009.01) |
| *G01C 21/00* | (2006.01) |
| *H04W 4/02* | (2018.01) |

(52) U.S. Cl.
CPC ........ *H04W 64/003* (2013.01); *G01C 21/005* (2013.01); *H04W 4/023* (2013.01)

(58) Field of Classification Search
USPC ....... 455/456.1; 705/13, 16, 43, 44, 35, 14.1
See application file for complete search history.

(56) References Cited

U.S. PATENT DOCUMENTS

| | | | |
|---|---|---|---|
| 8,204,809 B1* | 6/2012 | Wise | G06Q 40/06 705/35 |
| 2003/0182194 A1* | 9/2003 | Choey | G06Q 20/04 705/16 |
| 2004/0015393 A1* | 1/2004 | Fong | A47G 29/141 705/13 |
| 2010/0114677 A1* | 5/2010 | Carlson | G06Q 30/02 705/14.1 |
| 2013/0110718 A1* | 5/2013 | Al-Azzawi | G06Q 40/02 705/43 |
| 2014/0137199 A1* | 5/2014 | Hefetz | G06Q 20/32 726/3 |
| 2015/0149360 A1* | 5/2015 | Ezequiel | G06Q 20/325 705/44 |
| 2017/0070484 A1* | 3/2017 | Kruse | H04L 9/14 |
| 2018/0039975 A1* | 2/2018 | Hefetz | G06Q 20/3224 |

* cited by examiner

*Primary Examiner* — David Q Nguyen
(74) *Attorney, Agent, or Firm* — Harrity & Harrity, LLP

(57) ABSTRACT

A device receives, from a transaction device, transaction data associated with a transaction performed by a user, and receives first location data indicating a location of a mobile user device. The device receives, from a stationary user device, browser data associated with online activity of the user, and determines, based on the browser data, second location data indicating a location of the stationary user device. The device determines, based on the transaction data, third location data indicating a location of the transaction device, and assigns weights and time stamps to the first, second, and third location data. The device aggregates the first, second, and third location data, based on the weights and the time stamps, to generate aggregated location data. The device processes the aggregated location data, with a model, to predict a particular location of the user, and performs actions based on the particular location.

20 Claims, 12 Drawing Sheets

AGGREGATING LOCATION DATA OF A TRANSACTION DEVICE AND A USER DEVICE ASSOCIATED WITH A USER TO DETERMINE A LOCATION OF THE USER

BACKGROUND

A transaction device may include an automated teller machine (ATM) device, a point of sale (POS) device, a kiosk device, and/or the like. A user of a transaction device may conduct a variety of transactions via the transaction device, such as receiving money, depositing money, checking an account balance, purchasing a product, and/or the like.

SUMMARY

According to some implementations, a method may include receiving, from a transaction device, transaction data associated with a transaction performed by a user via the transaction device, and receiving first location data indicating a location of a mobile user device associated with the user. The method may include receiving, from a stationary user device associated with the user, browser data associated with online activity of the user, and determining second location data based on the browser data, wherein the second location data may indicate a location of the stationary user device. The method may include determining third location data based on the transaction data, wherein the third location data may indicate a location of the transaction device, and assigning a first weight to the first location data, a second weight to the second location data, and a third weight to the third location data. The method may include assigning a first time stamp to the first location data, a second time stamp to the second location data, and a third time stamp to the third location data, and aggregating the first location data, the second location data, and the third location data, based on the first weight, the second weight, the third weight, the first time stamp, the second time stamp, and the third time stamp, to generate aggregated location data. The method may include processing the aggregated location data, with a machine learning model, to predict a particular location of the user at a particular time, and performing one or more actions based on the particular location of the user at the particular time.

According to some implementations, a device may include one or more memories, and one or more processors, communicatively coupled to the one or more memories, to receive, from a transaction device, transaction data associated with a transaction performed by a user via the transaction device, and receive first location data indicating a location of a mobile user device associated with the user. The one or more processors may receive, from a stationary user device associated with the user, browser data associated with online activity of the user, and may determine second location data based on the browser data, wherein the second location data may indicate a location of the stationary user device. The one or more processors may determine third location data based on the transaction data, wherein the third location data may indicate a location of the transaction device, and may assign a first weight to the first location data, a second weight to the second location data, and a third weight to the third location data. The one or more processors may assign a first time stamp to the first location data, a second time stamp to the second location data, and a third time stamp to the third location data, and may aggregate the first location data, the second location data, and the third location data, based on the first weight, the second weight, the third weight, the first time stamp, the second time stamp, and the third time stamp, to generate aggregated location data. The one or more processors may process the aggregated location data, with a machine learning model, to predict a particular location of the user at a particular time, and may receive, from a third-party user device, a query for the particular location of the user at the particular time. The one or more processors may provide, to the third-party user device and based on the query, information generally indicating the particular location of the user at the particular time without revealing the particular location to the third-party user device.

According to some implementations, a non-transitory computer-readable medium may store instructions that include one or more instructions that, when executed by one or more processors of a device, cause the one or more processors to receive first location data indicating a location of a mobile user device associated with the user, and receive second location data indicating a location of a stationary user device associated with the user. The one or more instructions may cause the one or more processors to receive, from a transaction device, third location data indicating a location of the transaction device, wherein the user conducted a transaction via the transaction device, and assign a first weight to the first location data, a second weight to the second location data, and a third weight to the third location data. The one or more instructions may cause the one or more processors to assign a first time stamp to the first location data, a second time stamp to the second location data, and a third time stamp to the third location data, aggregate the first location data, the second location data, and the third location data, based on the first weight, the second weight, the third weight, the first time stamp, the second time stamp, and the third time stamp, to generate aggregated location data. The one or more instructions may cause the one or more processors to process the aggregated location data, with a machine learning model, to predict a particular location of the user at a particular time, and provide information identifying the particular location of the user at the particular time to the mobile user device and/or the stationary user device. The one or more instructions may cause the one or more processors to provide information generally indicating the particular location of the user at the particular time without revealing the particular location to a third-party user device.

DETAILED DESCRIPTION

Figure 1A:
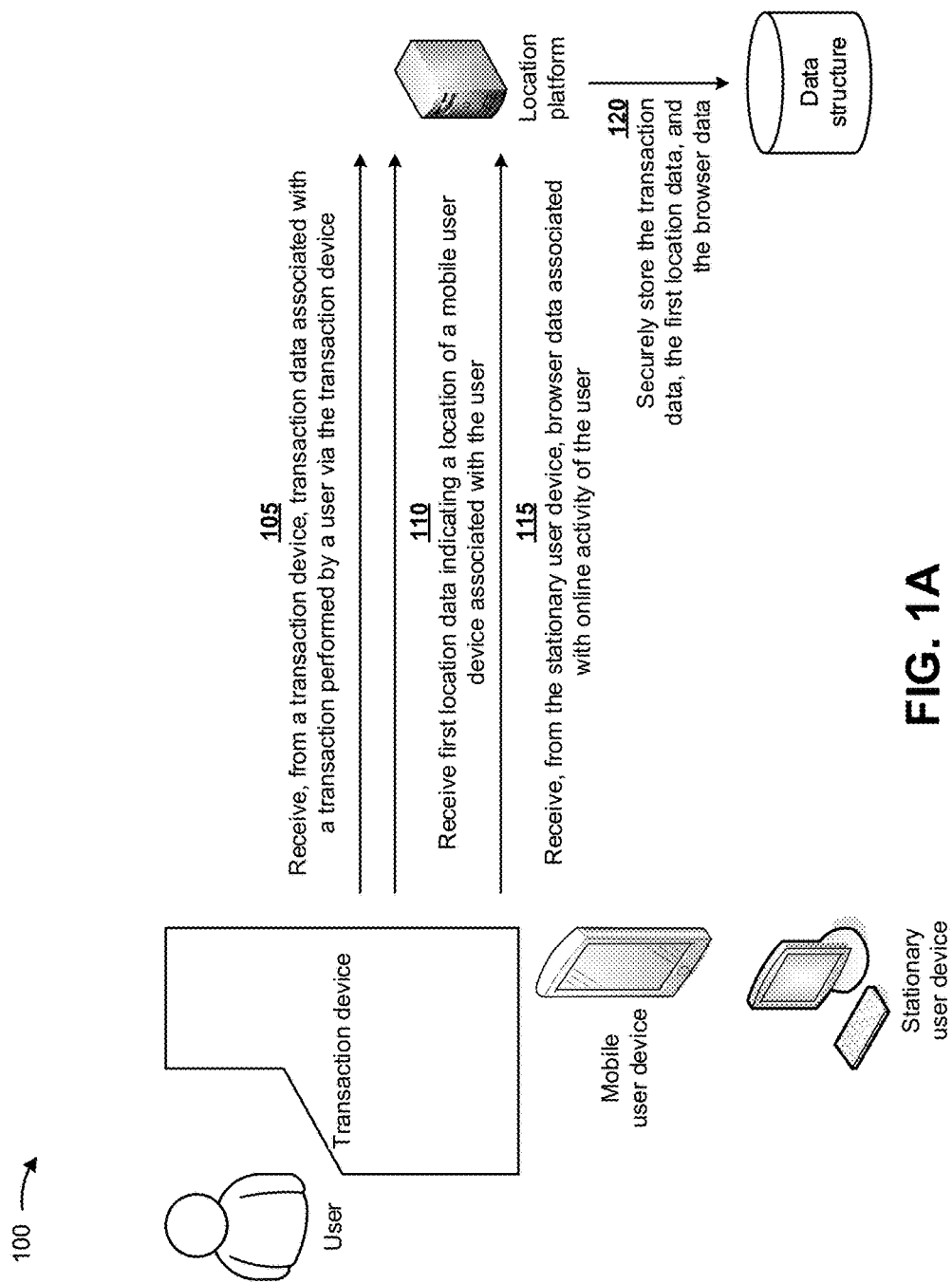
FIGS. 1A-1G are diagrams of one or more example implementations described herein.

The following detailed description of example implementations refers to the accompanying drawings. The same reference numbers in different drawings may identify the same or similar elements.

Entities, such as companies, may wish to track locations of users in order to provide offers for products and/or services tailored to the locations of the users, to learn information about the users, and/or the like. However, each entity needs to capture the locations of the users on their own, which causes redundant tracking of the locations of the users and infringes on the privacy of the users. Furthermore, the redundant tracking of the locations of the users causes the entities to waste computing resources (e.g., processing resources, memory resources, and/or the like), network resources, and/or the like associated with the entities. Finally, the location information of a user may be unreliable (e.g., may be inaccurate or include unknown accuracy).

Some implementations described herein provide a location platform that aggregates location data of a transaction device and a user device associated with a user to determine a location of the user. For example, the location platform may receive, from a transaction device, transaction data associated with a transaction performed by a user via the transaction device, and may receive first location data indicating a location of a mobile user device associated with the user. The location platform may receive, from a stationary user device associated with the user, browser data associated with online activity of the user, and may determine second location data based on the browser data, wherein the second location data may indicate a location of the stationary user device. The location platform may determine third location data based on the transaction data, wherein the third location data may indicate a location of the transaction device, and may assign a first weight to the first location data, a second weight to the second location data, and a third weight to the third location data. The location platform may assign a first time stamp to the first location data, a second time stamp to the second location data, and a third time stamp to the third location data, and may aggregate the first location data, the second location data, and the third location data, based on the first weight, the second weight, the third weight, the first time stamp, the second time stamp, and the third time stamp, to generate aggregated location data. The location platform may process the aggregated location data, with a machine learning model, to predict a particular location of the user at a particular time, and may perform one or more actions based on the particular location of the user at the particular time.

In some implementations, the location platform provides information regarding general locations of users to entities without allowing the entities to track actual locations of the users. As a result, the entities do not need to capture the locations of the users, which precludes redundant tracking of the locations of the users and maintains the privacy of the users. Also, the location platform conserves computing resources (e.g., processing resources, memory resources, and/or the like), network resources, and/or the like that would otherwise be wasted by the entities with the redundant tracking of the locations of the users.

FIGS. 1A-1G are diagrams of one or more example implementations 100 described herein. As shown in FIG. 1A, a transaction device may be associated with a location platform, a user, a mobile user device of the user (e.g., a smart phone), and a stationary user device of the user (e.g., a desktop computer). In some implementations, the location platform may receive, from a data structure (e.g., a database, a table, a list, and/or the like) associated with the location platform, information associating a user, a transaction card of the user, the mobile user device, and the stationary user device. In some implementations, the information associating the user, the transaction card, the mobile user device, and the stationary user device may be provided from information associated with an account of the user at a financial institution. The location platform may utilize the information associating the user, the transaction card, the mobile user device, and/or the stationary user device in order to communicate with the mobile user device, receive location data from the mobile user device, receive transaction data from the user device, communicate with the stationary user device, receive location data from the stationary user device, and/or the like.

The user may log into the transaction device (e.g., with a transaction card and/or the mobile user device) to conduct a transaction (e.g., a withdrawal, a deposit, a transfer, a purchase, and/or the like) via the transaction device. As further shown in FIG. 1A, and by reference number 105, the location platform may receive, from the transaction device, transaction data associated with a transaction performed by the user via the transaction device. In some implementations, the transaction data may include data identifying the user, an account associated with the user, the transaction being conducted by the user (e.g., a monetary withdrawal), the transaction device, a location of the transaction device, and/or the like. In some implementations, the location platform may be associated with hundreds, thousands, millions, and/or the like of transaction devices, mobile user devices, stationary user devices, and users; may receive transaction data from the transaction devices; and may receive location data from the transaction devices, the mobile user devices, and/or the stationary user devices.

As further shown in FIG. 1A, and by reference number 110, the location platform may receive, from the mobile user device, first location data indicating a location of the mobile user device associated with the user. In some implementations, the first location data may include global positioning system (GPS) coordinates of the mobile user device and may be provided by a GPS component of the mobile user device. In some implementations, the mobile user device may include an application that periodically provides the GPS coordinates to the location platform, the location platform may periodically request and receive the GPS coordinates from the mobile user device, and/or the like.

As further shown in FIG. 1A, and by reference number 115, the location platform may receive, from the stationary user device, browser data associated with online activity of the user via the stationary user device. In some implementations, the browser data may be provided by a browser extension associated with the stationary user device, an application associated with the stationary device, and/or the like. In some implementations, the browser data may include an Internet protocol (IP) address associated with the stationary user device. In some implementations, the stationary user device may include a browser extension and/or an application that periodically provides the browser data to the location platform, the location platform may periodically request and receive the browser data from the stationary user device, and/or the like.

As further shown in FIG. 1A, and by reference number 120, the location platform may securely store the transaction data, the first location data, and the browser data in a data structure (e.g., a database, a table, a list, and/or the like) associated with the location platform. In some implementations, to the extent the location platform collects, stores, and/or employs personal information of the user (e.g., the transaction data, the first location data, and/or the browser data), the location platform may use the personal information in accordance with applicable laws concerning protection of personal information. Additionally, the collection, storage, and/or use of the personal information can be subject to consent of the user to such activity, for example, through well-known "opt-in" or "opt-out" processes as can be appropriate for the situation and type of information. Storage and use of the personal information can be in an appropriately secure manner reflective of the type of information, for example, through various encryption and anonymization techniques for particularly sensitive information.

Figure 1B:
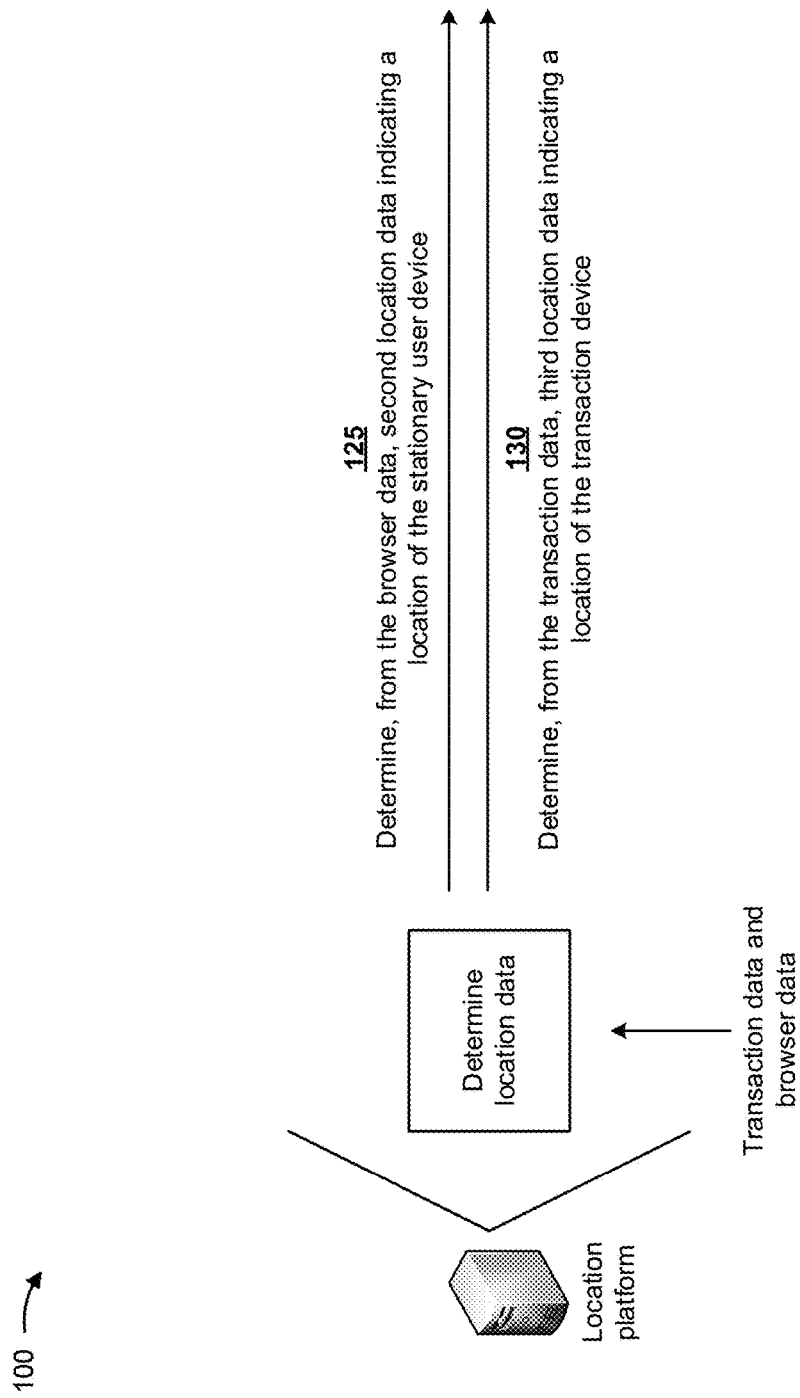

As shown in FIG. 1B, and by reference number 125, the location platform may determine, from the browser data, second location data indicating a location of the stationary user device. In some implementations, the browser data may include an IP address associated with the stationary user device and the location platform may utilize geolocation by IP address to determine the second location data indicating the location of the stationary user device. Geolocation by IP address may include a technique of determining a geographic latitude, longitude of the stationary user device and, by inference, a city, a region, and a nation associated with the stationary user device, by comparing the IP address associated with the stationary user device with known locations of other electronically neighboring server devices and/or network devices.

As further shown in FIG. 1B, and by reference number 130, the location platform may determine, from the transaction data, third location data indicating a location of the transaction device. In some implementations, the transaction data may include the GPS location of the transaction device, and the location platform may determine the third location data to be the GPS location of the transaction device. In some implementations, transaction data may include an IP address associated with the transaction device. In such implementations, the location platform may utilize geolocation by IP address to determine the third location data indicating the location of the transaction device. In some implementations, the transaction data may include other identifying information that the location platform can use to look up a location of the transaction device in a data structure or by communicating with another device.

Figure 1C:
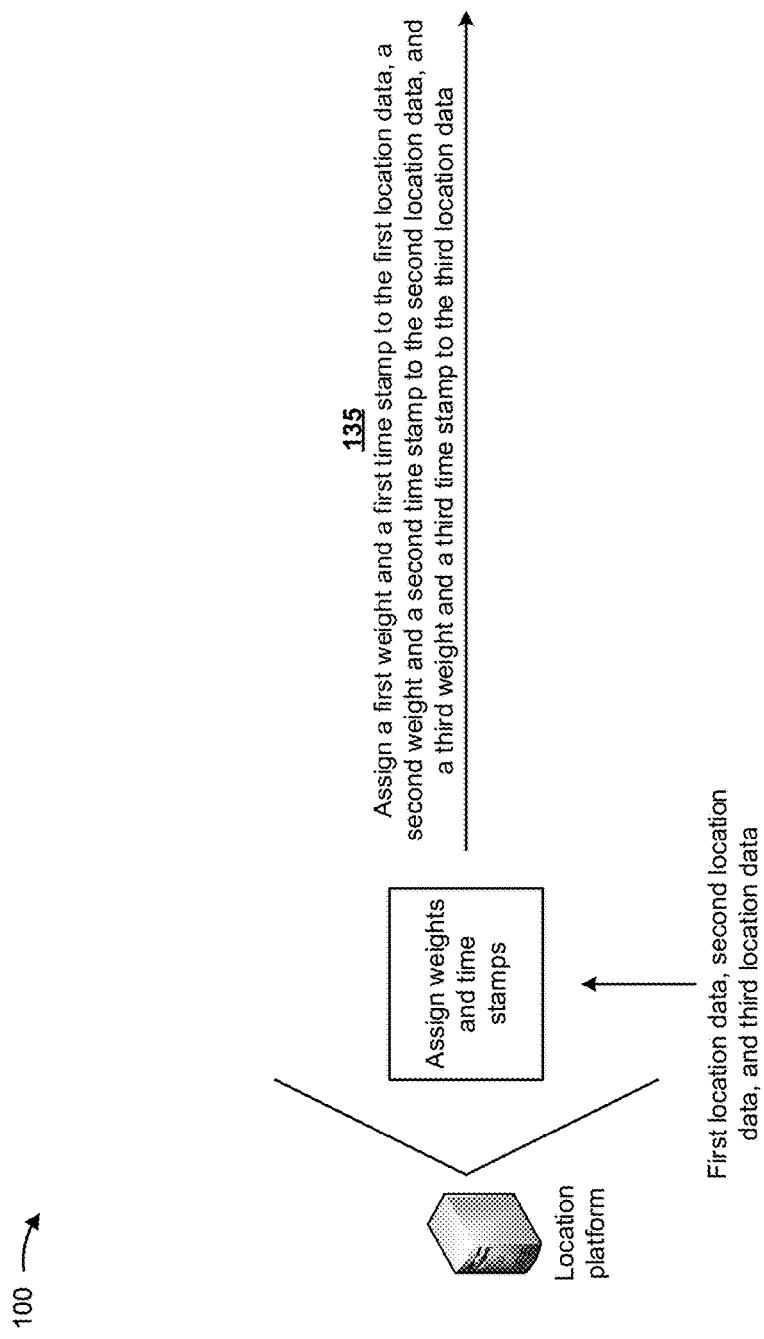

As shown in FIG. 1C, the location platform may assign a first weight and a first time stamp to the first location data, a second weight and a second time stamp to the second location data, and a third weight and a third time stamp to the third location data. In some implementations, the location platform may assign a weight to a combination of location data and a time stamp based on a reliability associated with the location data, not based on the reliability associated with the location, and/or the like. For example, if the first location data associated with the mobile user device indicates that the user is in location A at time X and the transaction data (e.g., the third location data) indicates that the user is in location B at time Y, and if a time of interest is time Z and time Y is close to time Z but time X is not close to time Z, the location platform may assign a greater weight to the third location data because the third location data is more relevant even if the first location data (in isolation) would be more reliable.

In another example, the first location data may be more reliable than the second location data since the GPS coordinates of the mobile user device is a more reliable location indicator than the IP address of the stationary user device. Therefore, the location platform may assign a first weight to the first location data that is greater than the second weight assigned to the second location data. In another example, the third location data may be more reliable than the second location data since the GPS coordinates of the transaction device is a more reliable location indicator than the IP address of the stationary user device. Therefore, the location platform may assign a third weight to the third location data that is greater than the second weight assigned to the second location data. In another example, the third location data may be more reliable than the first location data since the location of the transaction device can be more reliably determined than the location of the mobile user device. Therefore, the location platform may assign a third weight to the third location data that is greater than the first weight assigned to the first location data.

These examples of assigning weights to location data are intended to be illustrative, and not limiting, of which location data could be weighted more than which other location data. In practice, the location platform may determine a measure of reliability of location data and may assign a weight to the location data based on the measure of reliability. For example, the location platform may use a machine learning model that has been trained to predict a measure of reliability of location data based on a type of the location data, a source of the location data, environmental factors of a location with which the location data is associated (e.g., GPS signals may not be received by the mobile user device in some locations, the transaction device may be moved and its location might not be reliable, and/or the like), a time stamp associated with the location data, and/or the like. The location platform may assign a higher weight to location data associated with a higher measure of reliability and a lower weight to location data associated with a lower measure of reliability.

In some implementations, the time stamps assigned to the location data may include a point in time (e.g., 12:30 PM on Dec. 1, 2018) associated with when the transaction data is received, the first location data is received, the browser data is received, the second location data is determined, the third location data is determined, and/or the like. In some implementations, the time stamps assigned to the location data may include a time period (e.g., on Dec. 1, 2018, between Dec. 1, 2018 and Dec. 3, 2018, and/or the like) associated with the first location data, the second location data, and/or the third location data.

Figure 1D:
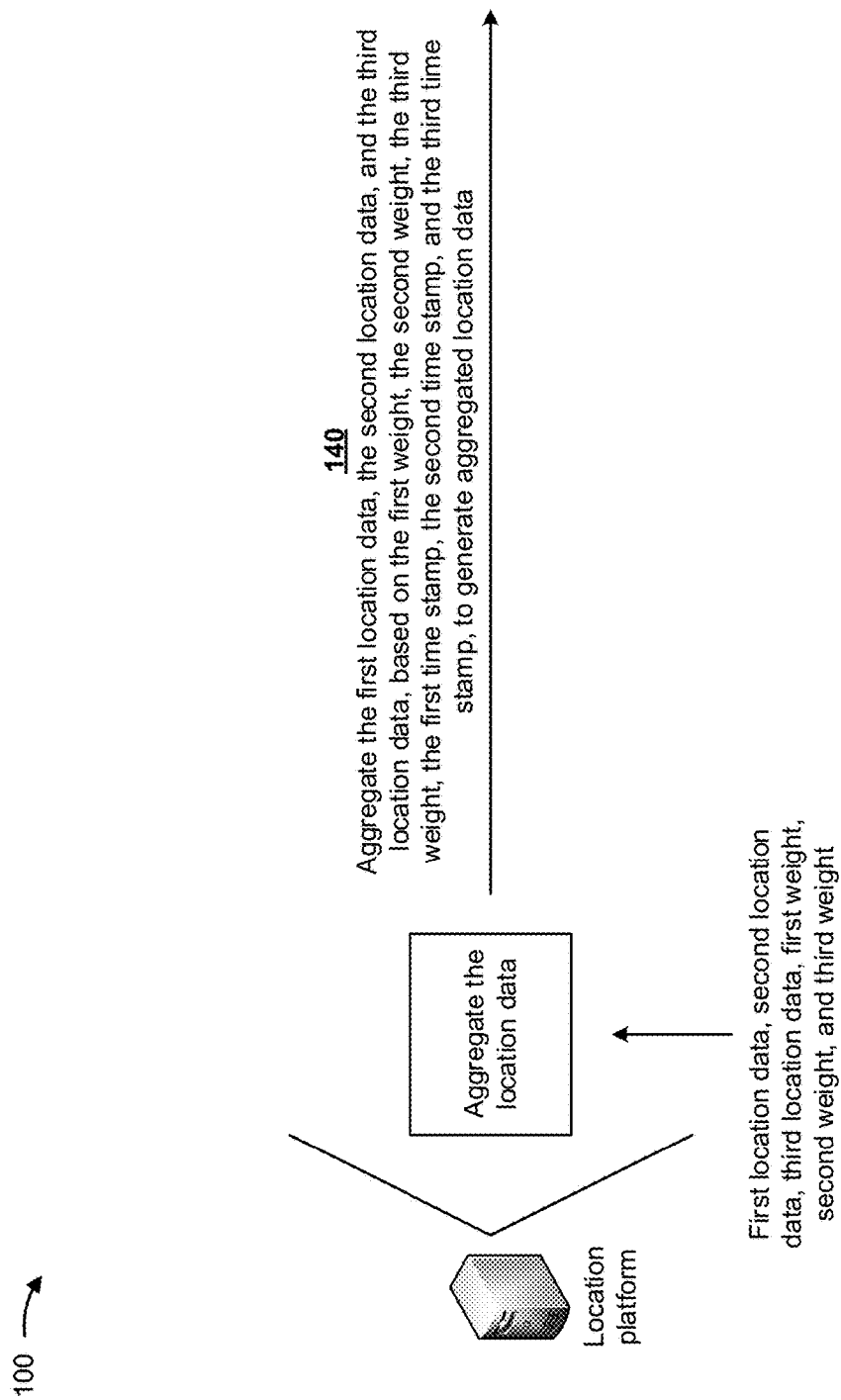

As shown in FIG. 1D, and by reference number 140, the location platform may aggregate the first location data, the second location data, and the third location data, based on the first weight, the second weight, the third weight, the first time stamp, the second time stamp, and the third time stamp, to generate aggregated location data. In some implementations, the location platform may aggregate the first location data, the second location data, and/or the third location data (e.g., and the corresponding weights) that include matching time stamps. For example, if the first location data (e.g., indicating that the mobile user device is located at an address) and the third location data (e.g., indicating that the transaction device is located at the address) include a common time stamp (e.g., Dec. 4, 2018), the location platform may aggregate the first location data and the third location data that include the common time stamp.

In some implementations, the location platform may aggregate the first location data, the second location data, and/or the third location data (e.g., and the corresponding weights) based on locations indicated by the first location data, the second location data, and the third location data. For example, if the first location data indicates that the mobile user device was located at particular GPS coordinates in a particular city at a particular time and the second location data indicates that the stationary user device is located in the particular city, the location platform may aggregate the first location data and the second location data associated with the particular GPS coordinates.

Figure 1E:
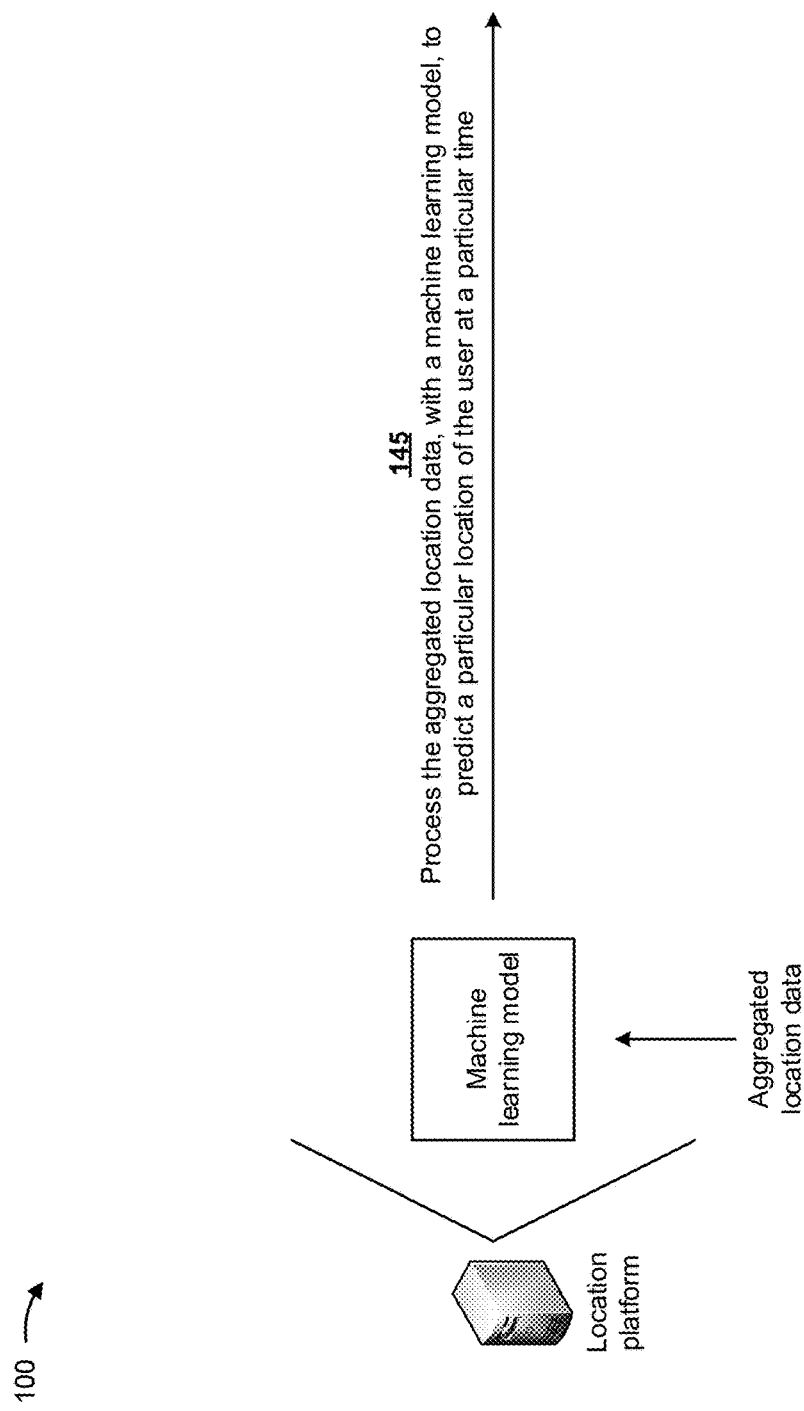

As shown in FIG. 1E, and by reference number 145, the location platform may process the aggregated location data, with a machine learning model, to predict a particular location of the user at a particular time. In some implementations, the machine learning model may include a pattern recognition model that generates predictions of particular locations of users based on location data. For example, the machine learning model may predict that the user is at a particular location (e.g., at a work location), at a particular time of the day (e.g., 9:00 AM to 5:00 PM on Monday through Friday) and performs transactions near the particular location from a particular transaction device at least once a week. In some implementations, the location platform may utilize the machine learning model to predict the particular location of the user at the particular time since the location data may provide conflicting data. For example, the browser data might indicate that the user was located at the stationary user device during time A, but the GPS data of the mobile user device may indicate that the user was in a different location at time A and/or the transaction data might indicate that the user was in yet another location at time A. The machine learning model may be utilized to resolve such conflicting data and to predict the particular location of the user at the particular time.

In some implementations, the location platform may perform a training operation on the machine learning model with historical transaction, browser, and location data. The historical transaction, browser, and location data may include data identifying transactions by users of transaction devices, data identifying locations of the transaction devices, data identifying locations associated with IP addresses, data identifying locations of mobile user devices, and/or the like.

In some implementations, the location platform may separate the historical transaction, browser, and location data into a training set, a validation set, a test set, and/or the like. The training set may be utilized to train the machine learning model. The validation set may be utilized to validate results generated based on training the machine learning model with the training set. The test set may be utilized to test results generated by the trained machine learning model.

In some implementations, the location platform may train the machine learning model using, for example, an unsupervised training procedure and based on the training set of the historical transaction, browser, and location data. For example, the location platform may perform dimensionality reduction to reduce the historical transaction, browser, and location data to a minimum feature set, thereby reducing resources (e.g., processing resources, memory resources, and/or the like) to train the machine learning model and may apply a classification technique to the minimum feature set.

In some implementations, the location platform may use a logistic regression classification technique to determine a categorical outcome (e.g., identification of particular locations of users based on the historical transaction, browser, and location data). Additionally, or alternatively, the location platform may use a naïve Bayesian classifier technique. In this case, the location platform may perform binary recursive partitioning to split the historical transaction, browser, and location data into partitions and/or branches and use the partitions and/or branches to perform predictions (e.g., identification of particular locations of users based on the historical transaction, browser, and location data). Based on using recursive partitioning, the location platform may reduce utilization of computing resources relative to manual, linear sorting and analysis of data points, thereby enabling use of thousands, millions, or billions of data points to train the machine learning model, which may result in a more accurate model than using fewer data points.

Additionally, or alternatively, the location platform may use a support vector machine (SVM) classifier technique to generate a non-linear boundary between data points in the training set. In this case, the non-linear boundary is used to classify test data into a particular class.

Additionally, or alternatively, the location platform may train the machine learning model using a supervised training procedure that includes receiving input to the machine learning model from a subject matter expert, which may reduce an amount of time, an amount of processing resources, and/or the like to train the machine learning model relative to an unsupervised training procedure. In some implementations, the location platform may use one or more other model training techniques, such as a neural network technique, a latent semantic indexing technique, and/or the like. For example, the location platform may perform an artificial neural network processing technique (e.g., using a two-layer feedforward neural network architecture, a three-layer feedforward neural network architecture, and/or the like) to perform pattern recognition with regard to optimal regions of the historical transaction, browser, and location data. In this case, using the artificial neural network processing technique may improve an accuracy of the trained machine learning model generated by the location platform by enabling the model to be more robust than unprocessed models to noisy, imprecise, or incomplete data, and by enabling the location platform to detect patterns and/or trends undetectable to human analysts or systems using less complex techniques.

In some implementations, the location platform may receive the trained machine learning model from another source. In such implementations, the location platform may utilize the trained machine learning model to process aggregated location data and to predict the particular location of the user at the particular time based on the aggregated location data.

In this way, the location platform may provide the aggregated location data as an input to the machine learning model, and the machine learning model may output information predicting a particular location of the user at a particular time based on the input.

Figure 1F:
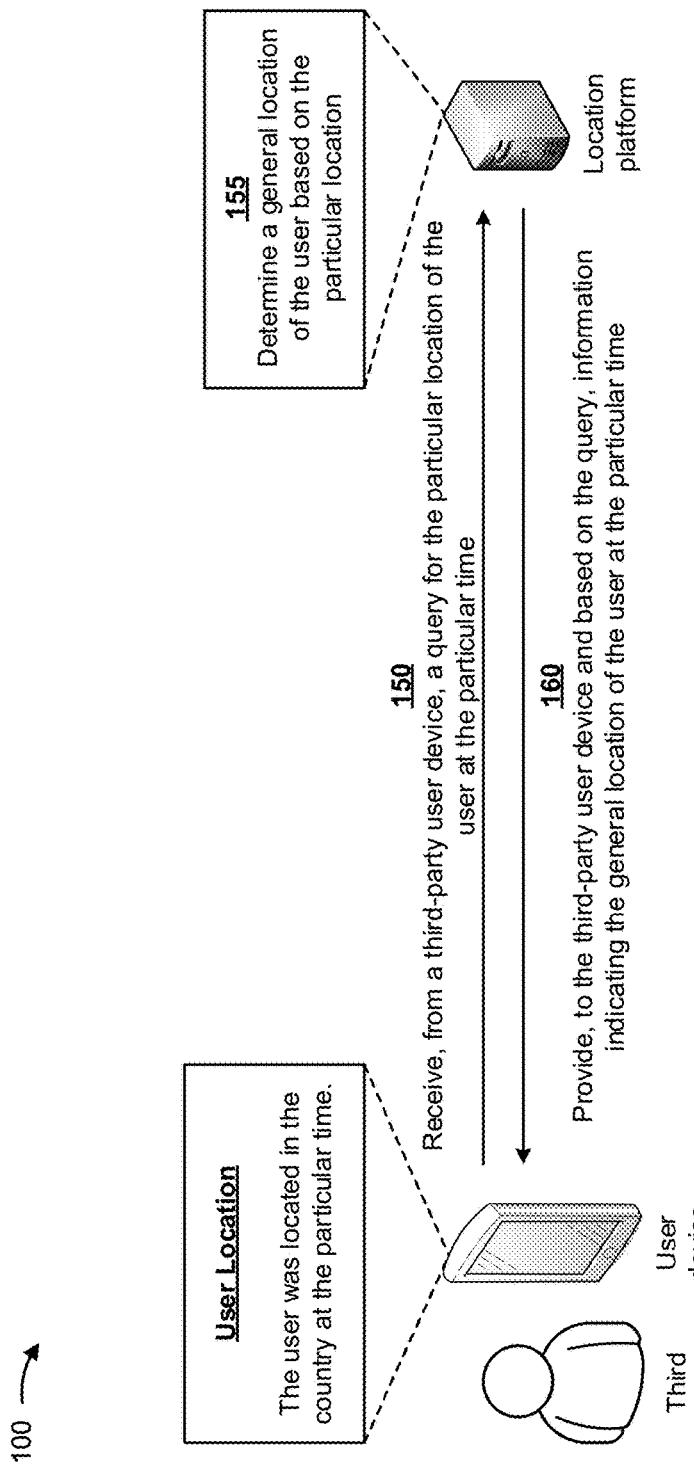

As shown in FIG. 1F, and by reference number 150, the location platform may receive, from a third-party user device, a query for the particular location of the user at the particular time. For example, the third-party user device may be associated with a delivery service that wishes to deliver a package to the user in person at the user's home address. In another example, the third-party user device may be associated with a government agency (e.g., the Internal Revenue Service or a state court) that wishes to determine whether the user was outside of the country during a certain time period for tax purposes, for jury duty purposes, and/or the like. In still another example, the third-party user device may be associated with a financial institution that wishes to verify that the user was outside of a standard geographical footprint on these days in order to prevent fraudulent transactions.

In some implementations, the user may utilize the mobile user device and/or the stationary user device to provide the query to the location platform on behalf of the third party. In such implementations, the location platform may provide a response (e.g., to the query) to the third-party user device, the mobile user device, and/or the stationary user device (e.g., and the response may include a general location of the user or a particular location of the user since the user is requesting the response). In some implementations, the third party may have an account with the location platform and may provide the query directly to the location platform. In such implementations, the location platform may provide a response (e.g., to the query) to the third-party user device, the mobile user device, and/or the stationary user device. In some implementations, the user may identify third parties that may receive information associated with the location of the user, may set up different controls for different third parties (e.g., a delivery service may not receive exact location information, but a government agency may receive exact location information), and/or the like.

As further shown in FIG. 1F, and by reference number 155, the location platform may determine a general location of the user based on the particular location. In some implementations, the general location may be a geographical location that is broader than an actual location or a geographical location that does not reveal an actual location (e.g., a general location is location at a lower level of specificity than an actual location). For example, the general location may indicate that the user is not located within a first country but may not indicate that the user is located within a second country. As another example, the general location may indicate that the user is located in a particular city but may not indicate a street or address of the user within the particular city. In this way, the location platform may provide a general location of the user so that third parties may not track an actual location of the user. This may serve to protect the privacy of the user by not revealing the actual location of the user to third parties.

As further shown in FIG. 1F, and by reference number 160, the location platform may provide, to the third-party user device and based on the query, information indicating the general location of the user at the particular time. For example, the location platform may provide information indicating that the user is not located at the user's home address at the particular time. Such information may be utilized by the third party (e.g., a delivery service) to determine that the delivery service should not deliver a package at the particular time. The third-party user device may receive the information indicating the general location of the user at the particular time and may display the information via a user interface to the user. For example, the user interface may indicate that the user was located in the country at the particular time.

Figure 1G:
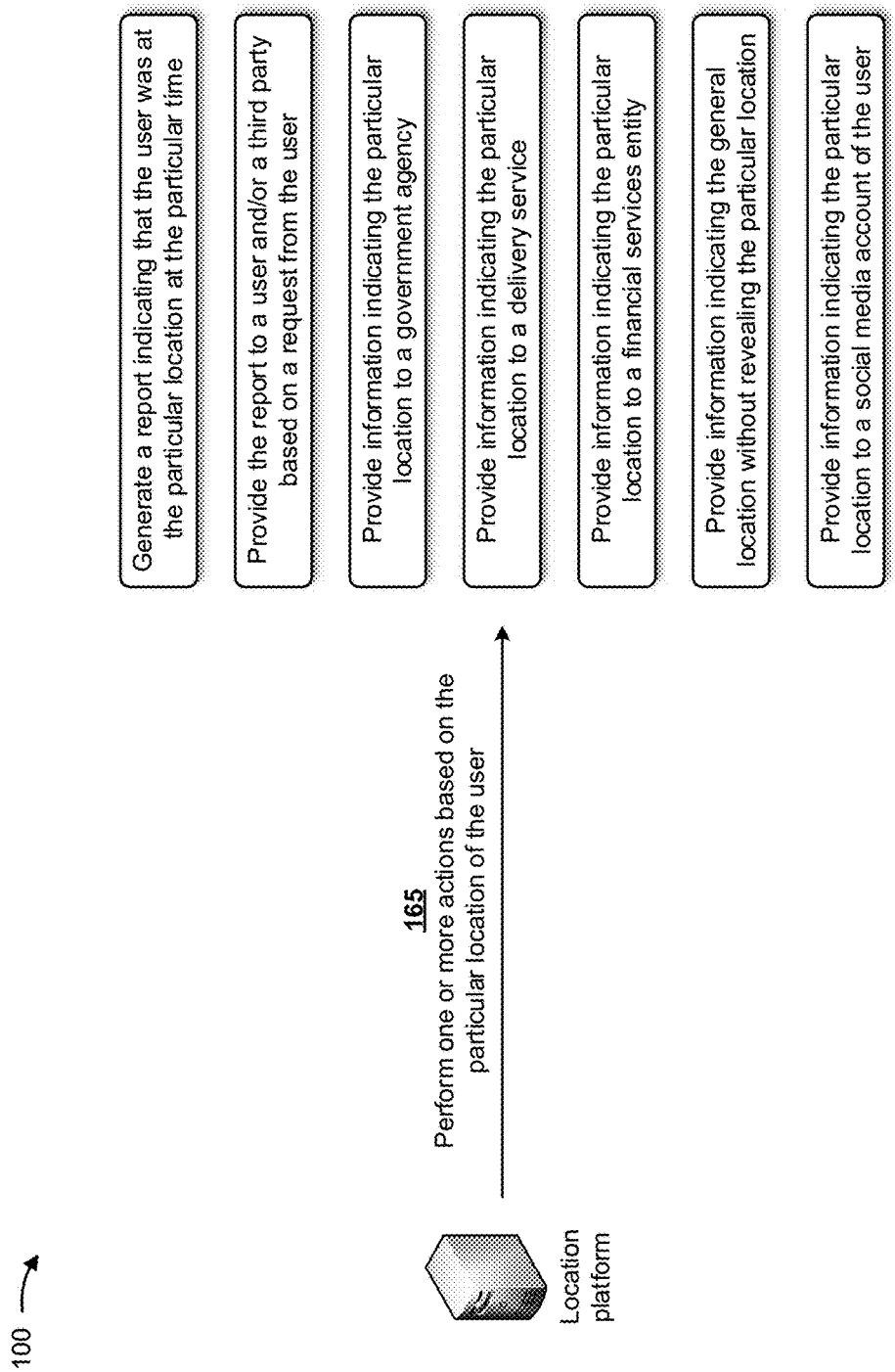

As shown in FIG. 1G, and by reference number 165, the location platform may perform one or more actions based on the particular location of the user. For example, the one or more actions may include the location platform generating a report indicating that the user was at the particular location at the particular time (e.g., for jury duty purposes). In this way, the location platform generates a report that may be utilized by the user to prove a fact to a government agency (e.g., that the user could not show up for jury duty), which conserves computing resources and/or network resources that would otherwise be wasted attempting to prove the fact.

In some implementations, the one or more actions may include the location platform providing the report to the user and/or to a third party based on a request from the user (e.g., the user requests the report for tax return purposes). In this way, the location platform provides a report that may be utilized by the user to prove a fact to a government agency (e.g., that the user was out of the country for tax purposes), which conserves computing resources and/or network resources that would otherwise be wasted attempting to prove the fact.

In some implementations, the one or more actions may include the location platform providing the information indicating the particular location to a government agency. In this way, the location platform enables the user to prove a fact to a government agency (e.g., that the user was out of the country for tax purposes), which conserves computing resources and/or network resources that would otherwise be wasted attempting to prove the fact.

In some implementations, the one or more actions may include the location platform providing the information indicating the particular location to a delivery service. In this way, the location platform enables the delivery service to not waste resources attempting to deliver a package when the user is not at home to receive the package.

In some implementations, the one or more actions may include the location platform providing the information indicating the particular location to a financial services entity. In this way, the location platform enables the financial services entity to conserve resources that would otherwise be wasted attempting to identify, investigate, and/or correct fraudulent activity.

In some implementations, the one or more actions may include the location platform providing information indicating the general location without revealing the particular location. In this way, the location platform protects the privacy of the user and prevents tracking of the user's location.

In some implementations, the one or more actions may include the location platform providing the information indicating the particular location to a social media account associated with the user. In this way, the location platform enables the user to inform social media contacts about the particular location of the user (e.g., "I am located at Joe's Diner").

In this way, several different stages of the process for aggregating location data of a transaction device and a user device associated with a user to determine a location of the user may be automated with a machine learning model, which may remove human subjectivity and waste from the process, and which may improve speed, accuracy, and efficiency of the process and conserve computing resources (e.g., processing resources, memory resources, and/or the like). Furthermore, implementations described herein use a rigorous, computerized process to perform tasks or roles that were not previously performed, or were previously performed using subjective human intuition or input. For example, currently there does not exist a technique that utilizes a machine learning model to aggregate location data of a transaction device and a user device associated with a user to determine a location of the user. Further, automating the process for aggregating location data of a transaction device and a user device associated with a user to determine a location of the user conserves computing resources (e.g., processing resources, memory resources, and/or the like) that would otherwise be wasted in attempting to track locations of users.

As indicated above, FIGS. 1A-1G are provided merely as examples. Other examples may differ from what is described with regard to FIGS. 1A-1G.

Figure 2:
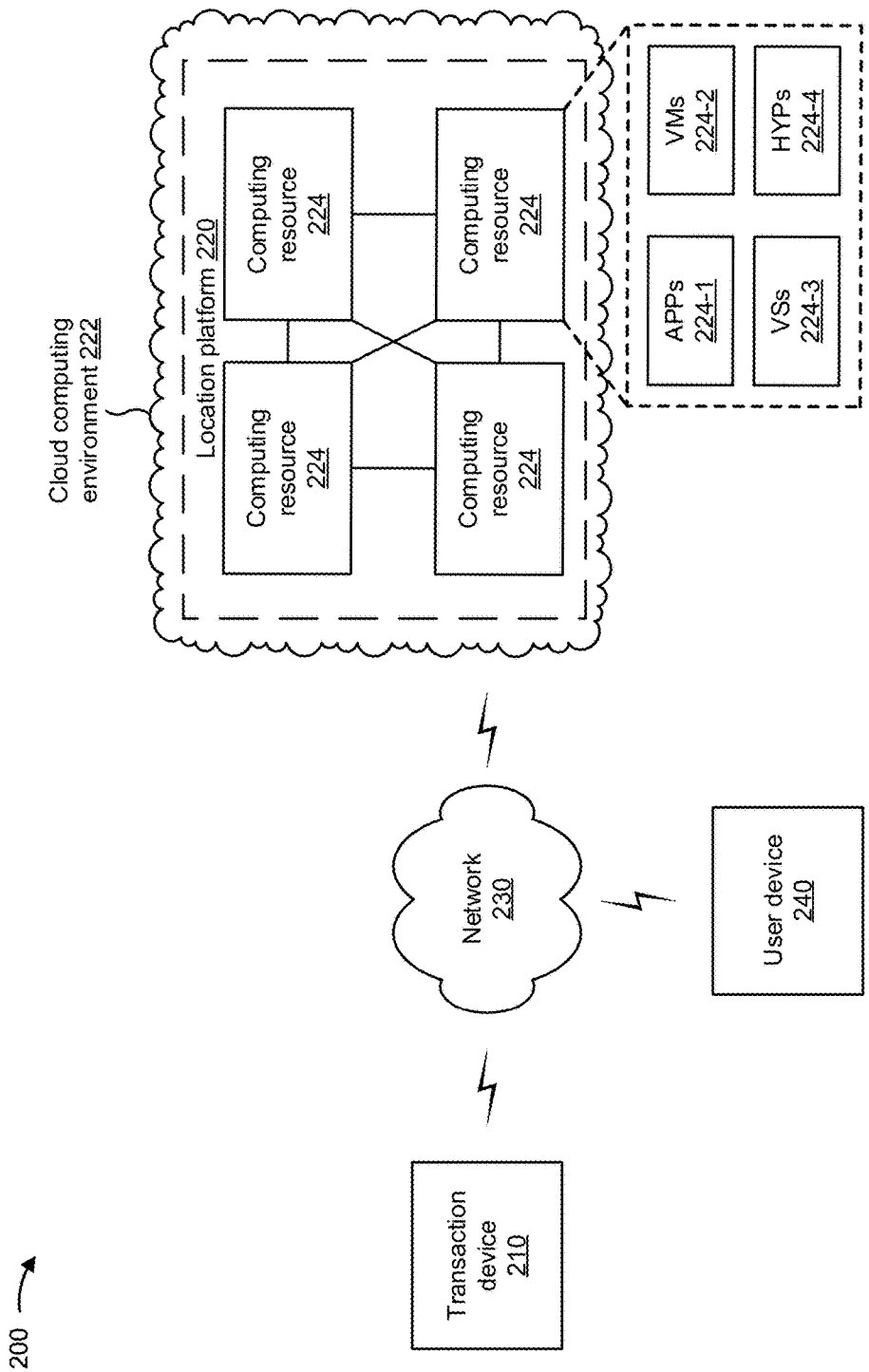
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include a transaction device 210, a location platform 220, a network 230, and a user device 240. Devices of environment 200 may interconnect via wired connections, wireless connections, or a combination of wired and wireless connections.

Transaction device 210 includes one or more devices capable of receiving, generating, storing, processing, and/or providing information, such as information described herein. For example, transaction device 210 may include an automated teller machine (ATM) device, a point of sale (POS) device, a kiosk device, and/or the like. In some implementations, transaction device 210 may include an input element (e.g., a keypad, a keyboard, a touchscreen display, and/or the like) for receiving input data from a user of the transaction device. In some implementations, transaction device 210 may include more than one input element (e.g., a keypad and a touchscreen display).

In some implementations, transaction device 210 may include an electronic telecommunications device that enables customers of financial institutions to perform financial transactions, such as cash withdrawals, deposits, transferring funds, obtaining account information, and/or the like, at any time and without direct interaction with employees of the financial institutions. In some implementations, transaction device 210 may include an electronic device used to process transaction card payments at retail locations. Transaction device 210 may read information from a transaction card (e.g., a credit card, a debit card, a gift card, and/or the like), and may determine whether there are sufficient funds in an account associated with the transaction card for a transaction. Transaction device 210 may transfer funds from the account associated with the transaction card to an account of a retailer and may record the transaction. In some implementations, transaction device 210 may include a computer terminal featuring specialized hardware and/or software that provides access to information and/or applications for communication, commerce, entertainment, education, and/or the like.

Location platform 220 includes one or more devices that may aggregate location data of a transaction device and a user device associated with a user to determine a location of the user. In some implementations, location platform 220 may be modular such that certain software components may be swapped in or out depending on a particular need. As such, location platform 220 may be easily and/or quickly reconfigured for different uses. In some implementations, location platform 220 may receive information from and/or transmit information to one or more transaction devices 210 and/or user devices 240.

In some implementations, as shown, location platform 220 may be hosted in a cloud computing environment 222. Notably, while implementations described herein describe location platform 220 as being hosted in cloud computing environment 222, in some implementations, location platform 220 may be non-cloud-based (i.e., may be implemented outside of a cloud computing environment) or may be partially cloud-based.

Cloud computing environment 222 includes an environment that may host location platform 220. Cloud computing environment 222 may provide computation, software, data access, storage, etc. services that do not require end-user knowledge of a physical location and configuration of system(s) and/or device(s) that host location platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host location platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by transaction device 210 and/or user device 240. Application 224-1 may eliminate a need to install and execute the software applications on transaction device 210 and/or user device 240. For example, application 224-1 may include software associated with location platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of transaction device 210 and/or user device 240 or an operator of location platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may provide administrators of the storage system with flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

User device 240 includes one or more devices capable of receiving, generating, storing, processing, and/or providing information, such as information described herein. For example, user device 240 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device 240 is a mobile user device, such as a mobile phone. In some implementations, user device 240 is a stationary user device, such as a desktop computer. In some implementations, user device 240 may receive information from and/or transmit information to transaction device 210 and/or location platform 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device and/or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
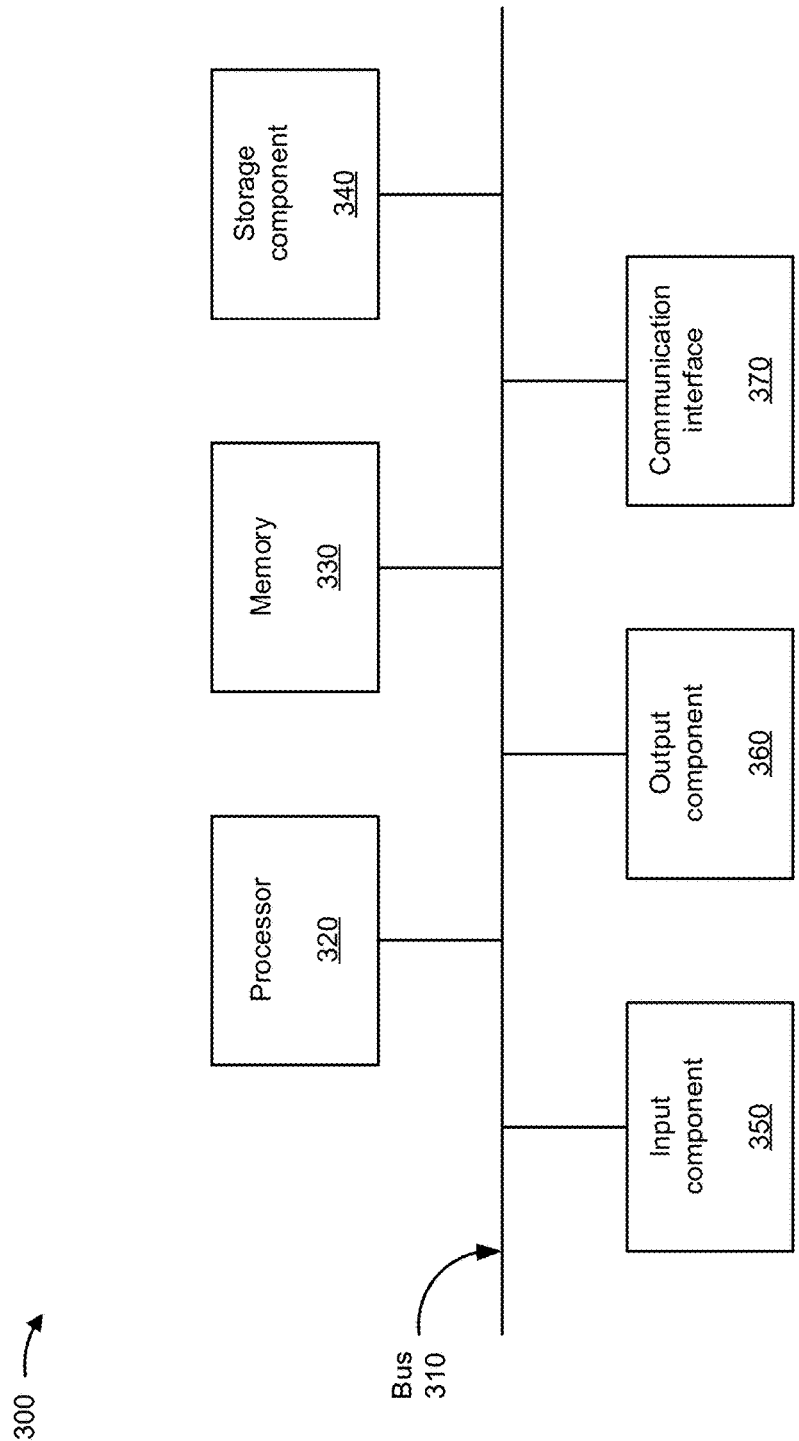
FIG. 3 is a diagram of example components of one or more devices of FIG. 2.

FIG. 3 is a diagram of example components of a device 300. Device 300 may correspond to transaction device 210, location platform 220, computing resource 224, and/or user device 240. In some implementations, transaction device 210, location platform 220, computing resource 224, and/or user device 240 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
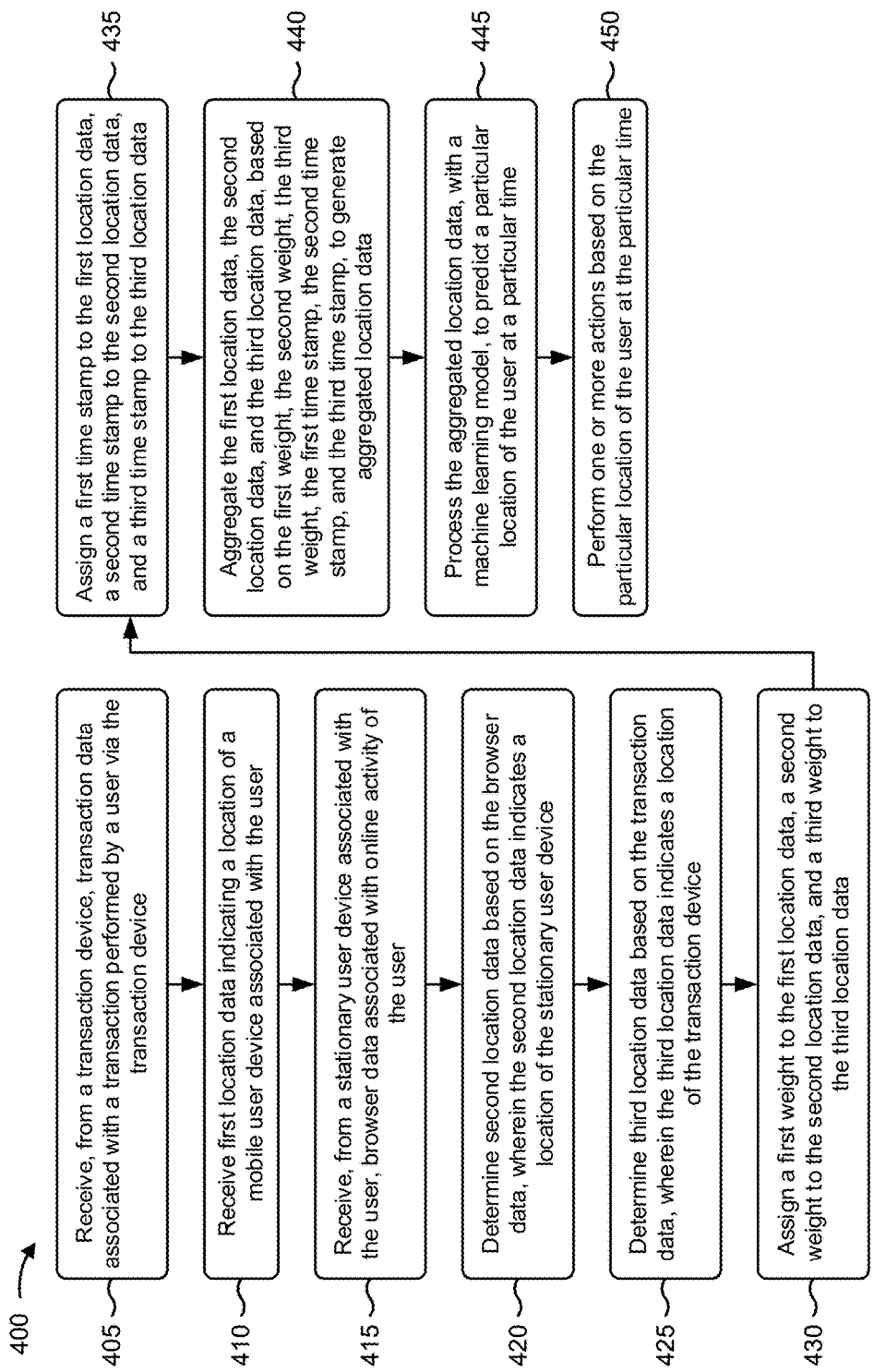
FIGS. 4-6 are flow charts of example processes for aggregating location data of a transaction device and a user device associated with a user to determine a location of the user.

FIG. 4 is a flow chart of an example process 400 for aggregating location data of a transaction device and a user device associated with a user to determine a location of the user. In some implementations, one or more process blocks of FIG. 4 may be performed by a location platform (e.g., location platform 220). In some implementations, one or more process blocks of FIG. 4 may be performed by another device or a group of devices separate from or including the location platform, such as a transaction device (e.g., transaction device 210) and/or a user device (e.g., user device 240).

As shown in FIG. 4, process 400 may include receiving, from a transaction device, transaction data associated with a transaction performed by a user via the transaction device (block 405). For example, the location platform (e.g., using computing resource 224, processor 320, communication interface 370, and/or the like) may receive, from a transaction device, transaction data associated with a transaction performed by a user via the transaction device, as described above in connection with FIGS. 1A-2.

As further shown in FIG. 4, process 400 may include receiving first location data indicating a location of a mobile user device associated with the user (block 410). For example, the location platform (e.g., using computing resource 224, processor 320, communication interface 370, and/or the like) may receive first location data indicating a location of a mobile user device associated with the user, as described above in connection with FIGS. 1A-2.

As further shown in FIG. 4, process 400 may include receiving, from a stationary user device associated with the user, browser data associated with online activity of the user (block 415). For example, the location platform (e.g., using computing resource 224, processor 320, communication interface 370, and/or the like) may receive, from a stationary user device associated with the user, browser data associated with online activity of the user, as described above in connection with FIGS. 1A-2.

As further shown in FIG. 4, process 400 may include determining second location data based on the browser data, wherein the second location data indicates a location of the stationary user device (block 420). For example, the location platform (e.g., using computing resource 224, processor 320, memory 330, and/or the like) may determine second location data based on the browser data, as described above in connection with FIGS. 1A-2. In some implementations, the second location data may indicate a location of the stationary user device.

As further shown in FIG. 4, process 400 may include determining third location data based on the transaction data, wherein the third location data indicates a location of the transaction device (block 425). For example, the location platform (e.g., using computing resource 224, processor 320, storage component 340, and/or the like) may determine third location data based on the transaction data, as described above in connection with FIGS. 1A-2. In some implementations, the third location data may indicate a location of the transaction device.

As further shown in FIG. 4, process 400 may include assigning a first weight to the first location data, a second weight to the second location data, and a third weight to the third location data (block 430). For example, the location platform (e.g., using computing resource 224, processor 320, memory 330, memory 330, and/or the like) may assign a first weight to the first location data, a second weight to the second location data, and a third weight to the third location data, as described above in connection with FIGS. 1A-2.

As further shown in FIG. 4, process 400 may include assigning a first time stamp to the first location data, a second time stamp to the second location data, and a third time stamp to the third location data (block 435). For example, the location platform (e.g., using computing resource 224, processor 320, storage component 340, and/or the like) may assign a first time stamp to the first location data, a second time stamp to the second location data, and a third time stamp to the third location data, as described above in connection with FIGS. 1A-2.

As further shown in FIG. 4, process 400 may include aggregating the first location data, the second location data, and the third location data, based on the first weight, the second weight, the third weight, the first time stamp, the second time stamp, and the third time stamp, to generate aggregated location data (block 440). For example, the location platform (e.g., using computing resource 224, processor 320, memory 330, and/or the like) may aggregate the first location data, the second location data, and the third location data, based on the first weight, the second weight, the third weight, the first time stamp, the second time stamp, and the third time stamp, to generate aggregated location data, as described above in connection with FIGS. 1A-2.

As further shown in FIG. 4, process 400 may include processing the aggregated location data, with a machine learning model, to predict a particular location of the user at a particular time (block 445). For example, the location platform (e.g., using computing resource 224, processor 320, storage component 340, and/or the like) may process the aggregated location data, with a machine learning model, to predict a particular location of the user at a particular time, as described above in connection with FIGS. 1A-2.

As further shown in FIG. 4, process 400 may include performing one or more actions based on the particular location of the user at the particular time (block 450). For example, the location platform (e.g., using computing resource 224, processor 320, memory 330, communication interface 370, and/or the like) may perform one or more actions based on the particular location of the user at the particular time, as described above in connection with FIGS. 1A-2.

Process 400 may include additional implementations, such as any single implementation or any combination of implementations described below and/or described with regard to any other process described herein.

In some implementations, the location platform may receive, from a third-party user device, a query for the particular location of the user at the particular time, may determine a general location of the user based on the particular location, and may provide, to the third-party user device and based on the query, information indicating the general location of the user at the particular time. In some implementations, the location platform may store the transaction data, the first location data, the browser data, and the aggregated location data in a secure data structure associated with the device.

In some implementations, when performing the one or more actions, the location platform may generate a report indicating that the user was at the particular location at the particular time; may provide the report to the mobile user device, the stationary user device, and/or a third-party user device based on a request from the user; may provide information indicating a general location of the user at the particular time, without revealing the particular location of the user at the particular time; and/or may provide the information indicating the particular location to a government agency, a delivery service, a financial services entity, and/or a social media account associated with the user.

In some implementations, the location platform may receive information identifying one or more third parties to receive information indicating the particular location of the user at the particular time, and, when performing the one or more actions, the location platform may determine a general location of the user based on the particular location, and may provide information indicating the general location of the user at the particular time to devices associated with the one or more third parties.

In some implementations, the first location data may be provided by a global positioning system (GPS) component of the mobile user device, and the browser data may be provided via a browser extension associated with the stationary user device. In some implementations, the third weight may be greater than the first weight.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
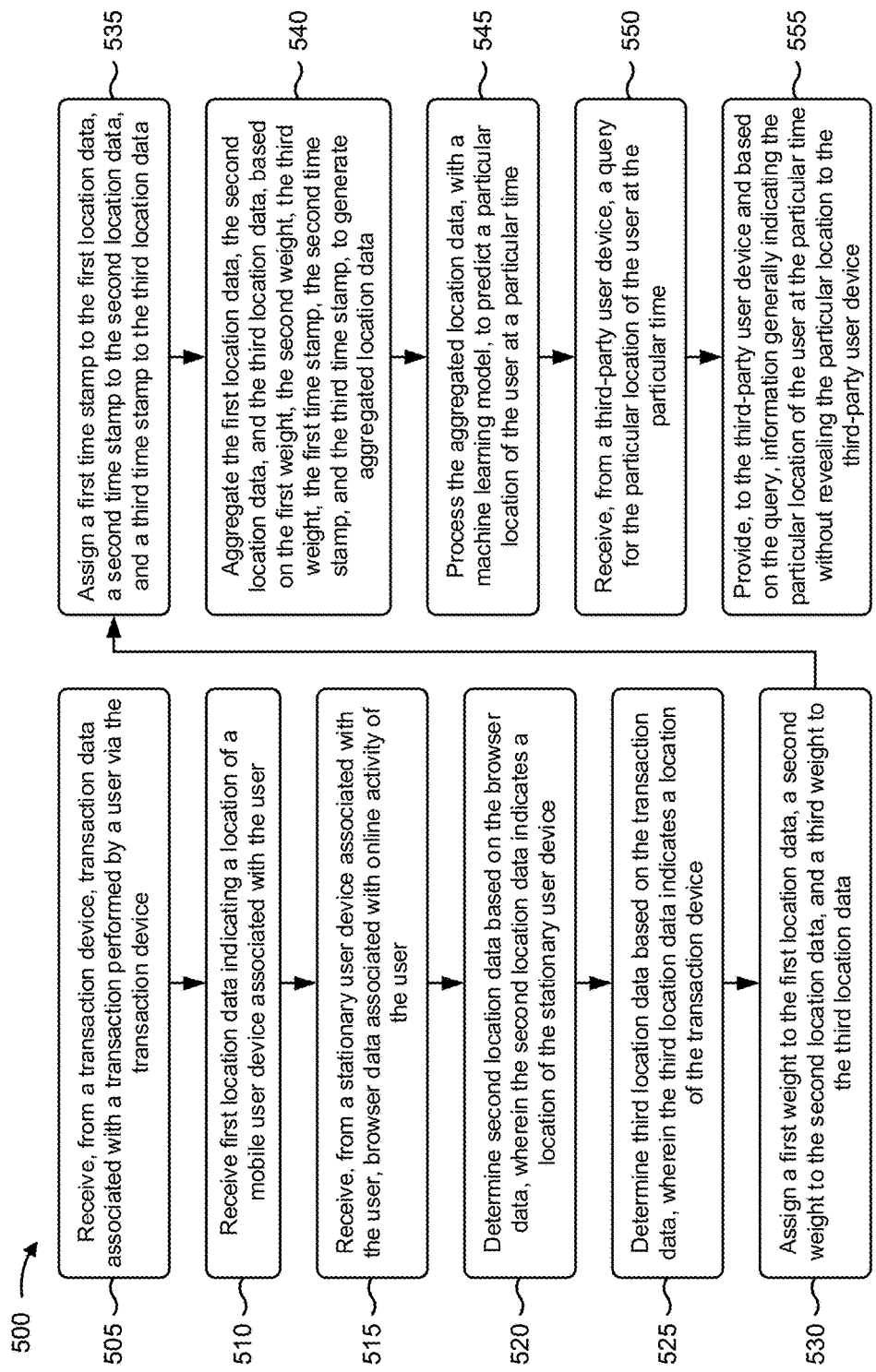

FIG. 5 is a flow chart of an example process 500 for aggregating location data of a transaction device and a user device associated with a user to determine a location of the user. In some implementations, one or more process blocks of FIG. 5 may be performed by a location platform (e.g., location platform 220). In some implementations, one or more process blocks of FIG. 5 may be performed by another device or a group of devices separate from or including the location platform, such as a transaction device (e.g., transaction device 210) and/or a user device (e.g., user device 240).

As shown in FIG. 5, process 500 may include receiving, from a transaction device, transaction data associated with a transaction performed by a user via the transaction device (block 505). For example, the location platform (e.g., using computing resource 224, processor 320, communication interface 370, and/or the like) may receive, from a transaction device, transaction data associated with a transaction performed by a user via the transaction device, as described above in connection with FIGS. 1A-2.

As further shown in FIG. 5, process 500 may include receiving first location data indicating a location of a mobile user device associated with the user (block 510). For example, the location platform (e.g., using computing resource 224, processor 320, communication interface 370, and/or the like) may receive first location data indicating a location of a mobile user device associated with the user, as described above in connection with FIGS. 1A-2.

As further shown in FIG. 5, process 500 may include receiving, from a stationary user device associated with the user, browser data associated with online activity of the user (block 515). For example, the location platform (e.g., using computing resource 224, processor 320, communication interface 370, and/or the like) may receive, from a stationary user device associated with the user, browser data associated with online activity of the user, as described above in connection with FIGS. 1A-2.

As further shown in FIG. 5, process 500 may include determining second location data based on the browser data, wherein the second location data indicates a location of the stationary user device (block 520). For example, the location platform (e.g., using computing resource 224, processor 320, memory 330, and/or the like) may determine second location data based on the browser data, as described above in connection with FIGS. 1A-2. In some implementations, the second location data may indicate a location of the stationary user device.

As further shown in FIG. 5, process 500 may include determining third location data based on the transaction data, wherein the third location data indicates a location of the transaction device (block 525). For example, the location platform (e.g., using computing resource 224, processor 320, storage component 340, and/or the like) may determine third location data based on the transaction data, as described above in connection with FIGS. 1A-2. In some implementations, the third location data may indicate a location of the transaction device.

As further shown in FIG. 5, process 500 may include assigning a first weight to the first location data, a second weight to the second location data, and a third weight to the third location data (block 530). For example, the location platform (e.g., using computing resource 224, processor 320, memory 330, and/or the like) may assign a first weight to the first location data, a second weight to the second location data, and a third weight to the third location data, as described above in connection with FIGS. 1A-2.

As further shown in FIG. 5, process 500 may include assigning a first time stamp to the first location data, a second time stamp to the second location data, and a third time stamp to the third location data (block 535). For example, the location platform (e.g., using computing resource 224, processor 320, storage component 340, and/or the like) may assign a first time stamp to the first location data, a second time stamp to the second location data, and a third time stamp to the third location data, as described above in connection with FIGS. 1A-2.

As further shown in FIG. 5, process 500 may include aggregating the first location data, the second location data, and the third location data, based on the first weight, the second weight, the third weight, the first time stamp, the second time stamp, and the third time stamp, to generate aggregated location data (block 540). For example, the location platform (e.g., using computing resource 224, processor 320, memory 330, and/or the like) may aggregate the first location data, the second location data, and the third location data, based on the first weight, the second weight, the third weight, the first time stamp, the second time stamp, and the third time stamp, to generate aggregated location data, as described above in connection with FIGS. 1A-2.

As further shown in FIG. 5, process 500 may include processing the aggregated location data, with a machine learning model, to predict a particular location of the user at a particular time (block 545). For example, the location platform (e.g., using computing resource 224, processor 320, storage component 340, and/or the like) may process the aggregated location data, with a machine learning model, to predict a particular location of the user at a particular time, as described above in connection with FIGS. 1A-2.

As further shown in FIG. 5, process 500 may include receiving, from a third-party user device, a query for the particular location of the user at the particular time (block 550). For example, the location platform (e.g., using computing resource 224, processor 320, communication interface 370, and/or the like) may receive, from a third-party user device, a query for the particular location of the user at the particular time, as described above in connection with FIGS. 1A-2.

As further shown in FIG. 5, process 500 may include providing, to the third-party user device and based on the query, information generally indicating the particular location of the user at the particular time without revealing the particular location to the third-party user device (block 555). For example, the location platform (e.g., using computing resource 224, processor 320, communication interface 370, and/or the like) may provide, to the third-party user device and based on the query, information generally indicating the particular location of the user at the particular time without revealing the particular location to the third-party user device, as described above in connection with FIGS. 1A-2.

Process 500 may include additional implementations, such as any single implementation or any combination of implementations described below and/or described with regard to any other process described herein.

In some implementations, the location platform may receive camera data from a camera associated with the transaction device, may verify that the transaction is performed by the user based on the camera data, and may determine that the transaction data is to be utilized to determine the third location data based on verifying that the transaction is performed by the user. In some implementations, the location platform may provide information indicating the particular location to a government agency, a delivery service, a financial services entity, and/or a social media account associated with the user.

In some implementations, the location platform may store the transaction data, the first location data, the second location data, and the aggregated location data in a secure data structure associated with the device. In some implementations, the location platform may receive information identifying one or more third parties to receive information indicating the particular location of the user at the particular time, and may provide the information indicating the particular location of the user at the particular time to devices associated with the one or more third parties.

In some implementations, the first location data may be provided by a global positioning system (GPS) component of the mobile user device, and the browser data may be provided via a browser extension associated with the stationary user device. In some implementations, the location platform may generate a report indicating that the user was at the particular location at the particular time, and may provide the report to the mobile user device, the stationary user device, and/or a third-party user device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
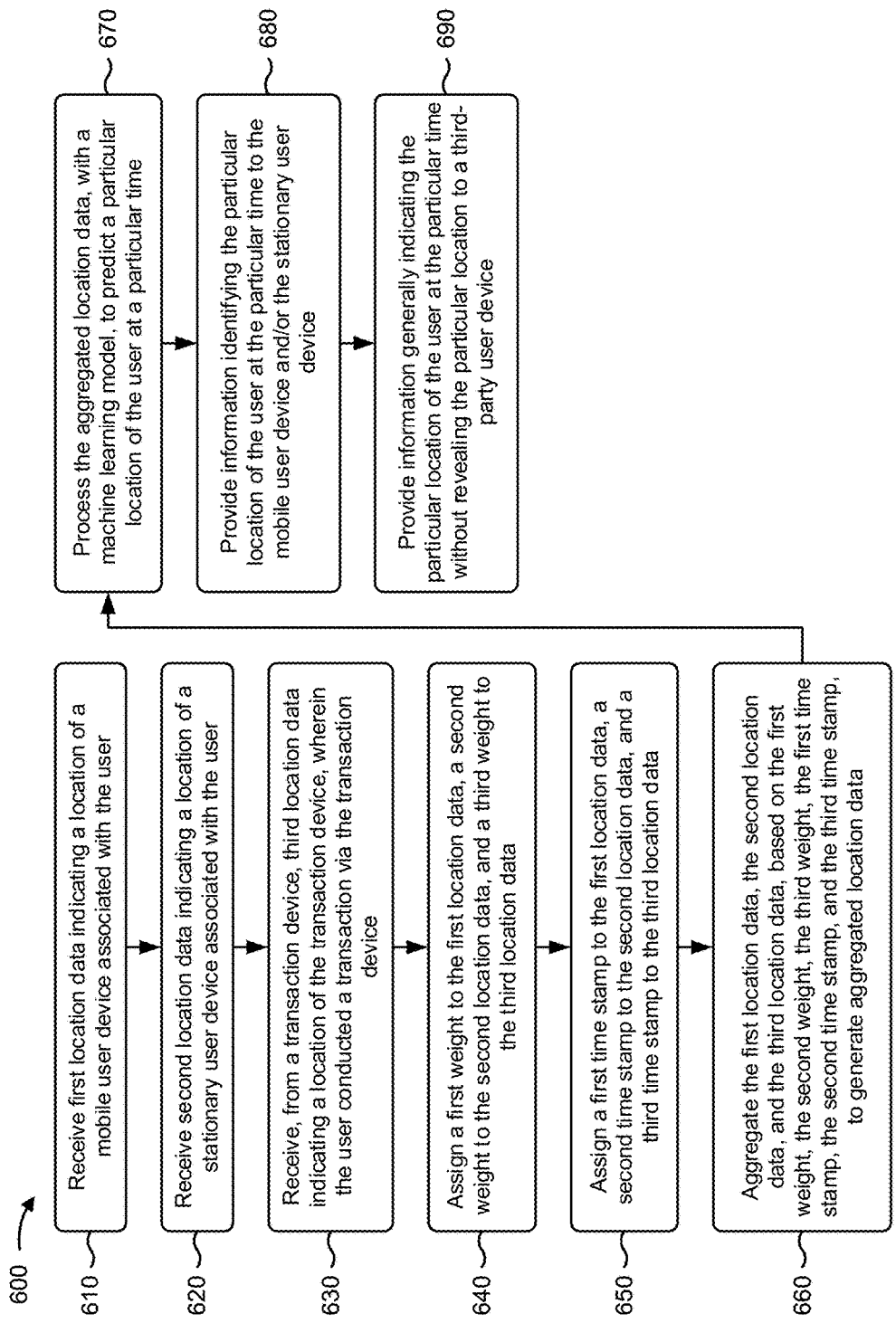

FIG. 6 is a flow chart of an example process 600 for aggregating location data of a transaction device and a user device associated with a user to determine a location of the user. In some implementations, one or more process blocks of FIG. 6 may be performed by a location platform (e.g., location platform 220). In some implementations, one or more process blocks of FIG. 6 may be performed by another device or a group of devices separate from or including the location platform, such as a transaction device (e.g., transaction device 210) and/or a user device (e.g., user device 240).

As shown in FIG. 6, process 600 may include receiving first location data indicating a location of a mobile user device associated with the user (block 610). For example, the location platform (e.g., using computing resource 224, processor 320, communication interface 370, and/or the like) may receive first location data indicating a location of a mobile user device associated with the user, as described above in connection with FIGS. 1A-2.

As further shown in FIG. 6, process 600 may include receiving second location data indicating a location of a stationary user device associated with the user (block 620). For example, the location platform (e.g., using computing resource 224, processor 320, communication interface 370, and/or the like) may receive second location data indicating a location of a stationary user device associated with the user, as described above in connection with FIGS. 1A-2.

As further shown in FIG. 6, process 600 may include receiving, from a transaction device, third location data indicating a location of the transaction device, wherein the user conducted a transaction via the transaction device (block 630). For example, the location platform (e.g., using computing resource 224, processor 320, communication interface 370, and/or the like) may receive, from a transaction device, third location data indicating a location of the transaction device, as described above in connection with FIGS. 1A-2. In some implementations, the user may have conducted a transaction via the transaction device.

As further shown in FIG. 6, process 600 may include assigning a first weight to the first location data, a second weight to the second location data, and a third weight to the third location data (block 640). For example, the location platform (e.g., using computing resource 224, processor 320, memory 330, and/or the like) may assign a first weight to the first location data, a second weight to the second location data, and a third weight to the third location data, as described above in connection with FIGS. 1A-2.

As further shown in FIG. 6, process 600 may include assigning a first time stamp to the first location data, a second time stamp to the second location data, and a third time stamp to the third location data (block 650). For example, the location platform (e.g., using computing resource 224, processor 320, storage component 340, and/or the like) may assign a first time stamp to the first location data, a second time stamp to the second location data, and a third time stamp to the third location data, as described above in connection with FIGS. 1A-2.

As further shown in FIG. 6, process 600 may include aggregating the first location data, the second location data, and the third location data, based on the first weight, the second weight, the third weight, the first time stamp, the second time stamp, and the third time stamp, to generate aggregated location data (block 660). For example, the location platform (e.g., using computing resource 224, processor 320, memory 330, and/or the like) may aggregate the first location data, the second location data, and the third location data, based on the first weight, the second weight, the third weight, the first time stamp, the second time stamp, and the third time stamp, to generate aggregated location data, as described above in connection with FIGS. 1A-2.

As further shown in FIG. 6, process 600 may include processing the aggregated location data, with a machine learning model, to predict a particular location of the user at a particular time (block 670). For example, the location platform (e.g., using computing resource 224, processor 320, storage component 340, and/or the like) may process the aggregated location data, with a machine learning model, to predict a particular location of the user at a particular time, as described above in connection with FIGS. 1A-2.

As further shown in FIG. 6, process 600 may include providing information identifying the particular location of the user at the particular time to the mobile user device and/or the stationary user device (block 680). For example, the location platform (e.g., using computing resource 224, processor 320, communication interface 370, and/or the like) may provide information identifying the particular location of the user at the particular time to the mobile user device and/or the stationary user device, as described above in connection with FIGS. 1A-2.

As further shown in FIG. 6, process 600 may include providing information generally indicating the particular location of the user at the particular time without revealing the particular location to a third-party user device (block 690). For example, the location platform (e.g., using computing resource 224, processor 320, communication interface 370, and/or the like) may provide information generally indicating the particular location of the user at the particular time without revealing the particular location to a third-party user device, as described above in connection with FIGS. 1A-2.

Process 600 may include additional implementations, such as any single implementation or any combination of implementations described below and/or described with regard to any other process described herein.

In some implementations, the location platform may receive, from the third-party user device, a query for a report associated with the particular location of the user at the particular time, may generate, based on the query, the report associated with the particular location of the user at the particular time, and may provide, to the third-party user device, the report associated with the particular location of the user at the particular time.

In some implementations, the first weight and the third weight may be greater than the second weight. In some implementations, the third-party user device may be associated with a government agency, a delivery service, a financial services entity, and/or a social media account associated with the user.

In some implementations, the location platform may receive information identifying one or more third parties to receive the information indicating the particular location of the user at the particular time, where the third-party user device is associated with the one or more third parties. In some implementations, the first location data may be provided by a global positioning system (GPS) component of the mobile user device, and the second location data may include an Internet protocol (IP) address associated with the stationary user device.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:

receiving, by a device and from a transaction device, transaction data associated with a transaction performed by a user via the transaction device;

receiving, by the device, first location data indicating a location of a mobile user device associated with the user;

receiving, by the device and from a stationary user device associated with the user, browser data associated with online activity of the user;

determining, by the device, second location data based on the browser data,
wherein the second location data indicates a location of the stationary user device;

determining, by the device, third location data based on the transaction data,
wherein the third location data indicates a location of the transaction device;

assigning, by the device, a first weight to the first location data, a second weight to the second location data, and a third weight to the third location data;

assigning, by the device, a first time stamp to the first location data, a second time stamp to the second location data, and a third time stamp to the third location data;

aggregating, by the device, the first location data, the second location data, and the third location data, based on the first weight, the second weight, the third weight, the first time stamp, the second time stamp, and the third time stamp, to generate aggregated location data;

processing, by the device, the aggregated location data, with a machine learning model, to predict a particular location of the user at a particular time; and performing, by the device, one or more actions based on the particular location of the user at the particular time.

2. The method of claim 1, further comprising:

receiving, from a third-party user device, a query for the particular location of the user at the particular time;

determining a general location of the user based on the particular location; and providing, to the third-party user device and based on the query, information indicating the general location of the user at the particular time.

3. The method of claim 1, further comprising:

storing the transaction data, the first location data, the browser data, and the aggregated location data in a secure data structure associated with the device.

4. The method of claim 1, wherein performing the one or more actions includes one or more of:

generating a report indicating that the user was at the particular location at the particular time;

providing the report to the mobile user device, the stationary user device, and/or a third-party user device based on a request from the user;

providing information indicating a general location of the user at the particular time, without revealing the particular location of the user at the particular time; or providing the information indicating the particular location to one or more of:
  a government agency,
  a delivery service,
  a financial services entity, or
  a social media account associated with the user.

5. The method of claim 1, further comprising:

receiving information identifying one or more third parties to receive information indicating the particular location of the user at the particular time, and wherein performing the one or more actions includes:
  determining a general location of the user based on the particular location; and
  providing information indicating the general location of the user at the particular time to devices associated with the one or more third parties.

6. The method of claim 1, wherein:

the first location data is provided by a global positioning system (GPS) component of the mobile user device, and the browser data is provided via a browser extension associated with the stationary user device.

7. The method of claim 1, wherein the third weight is greater than the first weight.

8. A device, comprising:

one or more memories; and one or more processors, communicatively coupled to the one or more memories, to:
  receive, from a transaction device, transaction data associated with a transaction performed by a user via the transaction device;
  receive first location data indicating a location of a mobile user device associated with the user;
  receive, from a stationary user device associated with the user, browser data associated with online activity of the user;
  determine second location data based on the browser data,
    wherein the second location data indicates a location of the stationary user device;
  determine third location data based on the transaction data,
    wherein the third location data indicates a location of the transaction device;
  assign a first weight to the first location data, a second weight to the second location data, and a third weight to the third location data;
  assign a first time stamp to the first location data, a second time stamp to the second location data, and a third time stamp to the third location data;
  aggregate the first location data, the second location data, and the third location data, based on the first weight, the second weight, the third weight, the first time stamp, the second time stamp, and the third time stamp, to generate aggregated location data;
  process the aggregated location data, with a machine learning model, to predict a particular location of the user at a particular time;
  receive, from a third-party user device, a query for the particular location of the user at the particular time; and
  provide, to the third-party user device and based on the query, information generally indicating the particular location of the user at the particular time without revealing the particular location to the third-party user device.

9. The device of claim 8, wherein the one or more processors are further to:

receive camera data from a camera associated with the transaction device;

verify that the transaction is performed by the user based on the camera data; and determine that the transaction data is to be utilized to determine the third location data based on verifying that the transaction is performed by the user.

10. The device of claim 8, wherein the one or more processors are further to:

provide information indicating the particular location to one or more of:
  a government agency,
  a delivery service,
  a financial services entity, or
  a social media account associated with the user.

11. The device of claim 8, wherein the one or more processors are further to:

store the transaction data, the first location data, the second location data, and the aggregated location data in a secure data structure associated with the device.

12. The device of claim 8, wherein the one or more processors are further to:

receive information identifying one or more third parties to receive information indicating the particular location of the user at the particular time; and provide the information indicating the particular location of the user at the particular time to devices associated with the one or more third parties.

13. The device of claim 8, wherein:

the first location data is provided by a global positioning system (GPS) component of the mobile user device, and the browser data is provided via a browser extension associated with the stationary user device.

14. The device of claim 8, wherein the one or more processors are further to:

generate a report indicating that the user was at the particular location at the particular time; and provide the report to the mobile user device, the stationary user device, and/or a third-party user device.

15. A non-transitory computer-readable medium storing instructions, the instructions comprising:
one or more instructions that, when executed by one or more processors of a device, cause the one or more processors to:
receive first location data indicating a location of a mobile user device associated with a user;
receive second location data indicating a location of a stationary user device associated with the user;
receive, from a transaction device, third location data indicating a location of the transaction device,
wherein the user conducted a transaction via the transaction device;
assign a first weight to the first location data, a second weight to the second location data, and a third weight to the third location data;
assign a first time stamp to the first location data, a second time stamp to the second location data, and a third time stamp to the third location data;
aggregate the first location data, the second location data, and the third location data, based on the first weight, the second weight, the third weight, the first time stamp, the second time stamp, and the third time stamp, to generate aggregated location data;
process the aggregated location data, with a machine learning model, to predict a particular location of the user at a particular time;
provide information identifying the particular location of the user at the particular time to the mobile user device and/or the stationary user device; and
provide information generally indicating the particular location of the user at the particular time without revealing the particular location to a third-party user device.

16. The non-transitory computer-readable medium of claim 15, wherein the instructions further comprise:
one or more instructions that, when executed by the one or more processors, cause the one or more processors to:
receive, from the third-party user device, a query for a report associated with the particular location of the user at the particular time;
generate, based on the query, the report associated with the particular location of the user at the particular time; and
provide, to the third-party user device, the report associated with the particular location of the user at the particular time.

17. The non-transitory computer-readable medium of claim 15, wherein:
the first weight and the third weight are greater than the second weight.

18. The non-transitory computer-readable medium of claim 15, wherein the third-party user device is associated with one or more of:
a government agency,
a delivery service,
a financial services entity, or
a social media account associated with the user.

19. The non-transitory computer-readable medium of claim 15, wherein the instructions further comprise:
one or more instructions that, when executed by the one or more processors, cause the one or more processors to:
receive information identifying one or more third parties to receive the information indicating the particular location of the user at the particular time,
wherein the third-party user device is associated with the one or more third parties.

20. The non-transitory computer-readable medium of claim 15, wherein:
the first location data is provided by a global positioning system (GPS) component of the mobile user device, and
the second location data includes an Internet protocol (IP) address associated with the stationary user device.

* * * * *